(12) United States Patent
Kim (10) Patent No.: US 9,817,510 B2
(45) Date of Patent: *Nov. 14, 2017

(54) DISPLAY DEVICE WITH AN INTEGRATED TOUCH SCREEN AND METHOD OF DRIVING THE SAME

(71) Applicant: LG Display Co., Ltd., Seoul (KR)

(72) Inventor: Sung Chul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,632

(22) Filed: May 24, 2016

(65) Prior Publication Data

US 2016/0266715 A1    Sep. 15, 2016

Related U.S. Application Data

(63) Continuation of application No. 13/710,685, filed on Dec. 11, 2012, now Pat. No. 9,377,882.

(30) Foreign Application Priority Data

Aug. 30, 2012  (KR) .................... 10-2012-0095535

(51) Int. Cl.
*G06F 3/041* (2006.01)
*G09G 3/36* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS 6,323,846 B1    11/2001  Westerman et al.
9,377,882 B2 *   6/2016  Kim ........................ G06F 3/038
(Continued)

FOREIGN PATENT DOCUMENTS

CN    102402330 A    4/2012
CN    102411460 A    4/2012
(Continued)

OTHER PUBLICATIONS

Office Action for Chinese Patent Application No. CN 201210579749.7, dated Mar. 3, 2016, 16 Pages.
(Continued)

*Primary Examiner* — Patrick Edouard
*Assistant Examiner* — Douglas M Wilson
(74) *Attorney, Agent, or Firm* — Fenwick & West LLP (57) ABSTRACT

A display device with an integrated touch screen and a method of driving the same are provided. In a method of driving a display device including an integrated touch screen, including a panel including a plurality of electrodes that are divided into n number of groups, where n is an integer greater than or equal to two, and a touch sensing unit, the method includes: applying data voltages to a plurality of pixels of the panel, during a high logic period of a horizontal sync signal, and applying, by the touch sensing unit, a touch scan signal to one of the n groups every n or more low logic periods of the horizontal sync signal, the touch scan signal being applied to each of the n groups at least one time, during one frame.

32 Claims, 6 Drawing Sheets

(51) Int. Cl.
  *G02F 1/1343*  (2006.01)
  *G02F 1/1368*  (2006.01)
  *G06F 3/038*   (2013.01)
  *G06F 3/044*   (2006.01)
  *G02F 1/1333*  (2006.01)
  *G02F 1/1362*  (2006.01)

(52) U.S. Cl.
  CPC .. *G02F 1/134336* (2013.01); *G02F 1/136286* (2013.01); *G06F 3/038* (2013.01); *G06F 3/044* (2013.01); *G06F 3/0412* (2013.01); *G09G 3/3677* (2013.01); *G09G 3/3688* (2013.01); *G09G 3/3696* (2013.01); *G09G 2300/0809* (2013.01); *G09G 2310/027* (2013.01); *G09G 2310/0291* (2013.01)

(56) References Cited

U.S. PATENT DOCUMENTS

| | | |
|---|---|---|
| 2011/0048813 A1 | 3/2011 | Yilmaz |
| 2011/0261006 A1 | 10/2011 | Joharapurkar et al. |
| 2012/0056835 A1 | 3/2012 | Choo et al. |
| 2012/0068961 A1 | 3/2012 | Mizuhashi et al. |
| 2012/0075239 A1 | 3/2012 | Azumi et al. |
| 2012/0262390 A1 | 10/2012 | Kida et al. |
| 2013/0300953 A1 | 11/2013 | Hotelling et al. |

FOREIGN PATENT DOCUMENTS

| | | |
|---|---|---|
| CN | 102419669 A | 4/2012 |
| KR | 20120034502 A | 4/2012 |
| KR | 20120078072 A | 7/2012 |
| TW | 201227482 A1 | 7/2012 |

OTHER PUBLICATIONS

Office Action for U.S. Appl. No. 13/710,685, dated Dec. 2, 2015, 8 Pages.

Office Action for U.S. Appl. No. 13/710,685, dated Aug. 13, 2015, 20 Pages.

Office Action for U.S. Appl. No. 13/710,685, dated Feb. 25, 2015, 21 Pages.

Office Action for U.S. Appl. No. 13/710,685, dated Sep. 12, 2014, 22 Pages.

* cited by examiner

DISPLAY DEVICE WITH AN INTEGRATED TOUCH SCREEN AND METHOD OF DRIVING THE SAME

CROSS REFERENCE TO RELATED APPLICATION(S)

This application is a continuation application under 35 U.S.C. §120 of U.S. patent application Ser. No. 13/710,685 filed on Dec. 11, 2012, which claims the benefit under 35 U.S.C. §119(a) of Korean Patent Application No. 10-2012-0095535, filed on Aug. 30, 2012, in the Korean Intellectual Property Office, the entire disclosures of which are incorporated by reference herein for all purposes.

BACKGROUND

1. Technical Field

The following description relates to a display device, and more particularly, to a display device with an integrated touch screen and a method of driving the same.

2. Discussion of the Related Art

Touch screens are a type of input device that is included in image display devices such as Liquid Crystal Displays (LCDs), Field Emission Displays (FEDs), Plasma Display Panels (PDPs), Electroluminescent Displays (ELDs), and Electrophoretic Displays (EPDs), and allows a user to input predetermined information by applying a pressure (i.e., pressing or touching) to a touch sensor of a touch screen while looking at the image display device.

Particularly, the demand of display devices with integrated in-cell type touch screen, which include a plurality of built-in elements configuring the touch screen for slimming portable terminals such as smart phones and tablet Personal Computers (PCs), is recently increasing.

General display devices with integrated in-cell type touch screen transmit touch data to a system once every one vertical sync signal (Vsync) that defines one frame period.

Hereinafter, the driving of a related art display device with integrated in-cell type touch screen will be described with reference to FIG. 1.

Figure 1:
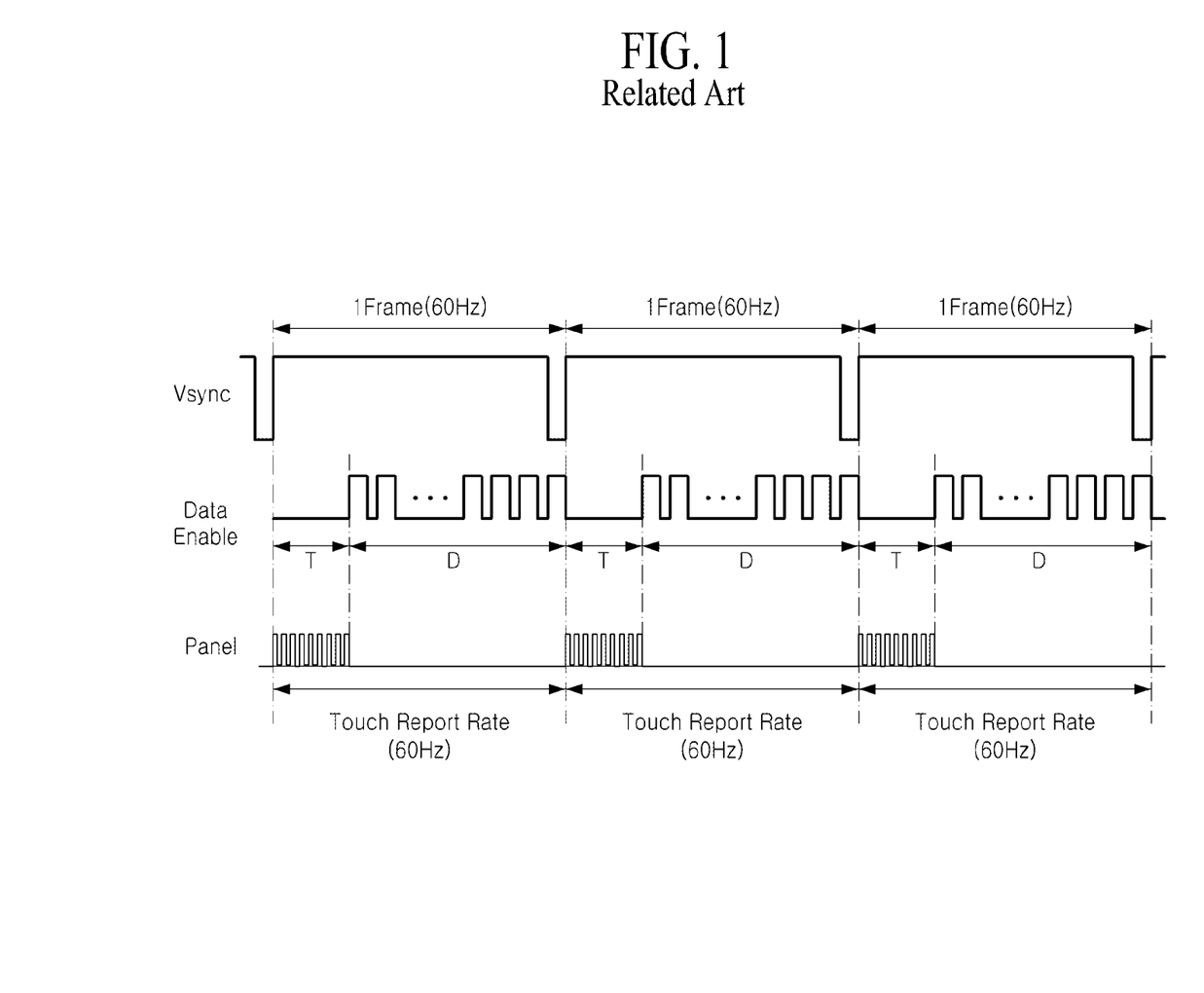
FIG. 1 is a timing chart showing signals in a display driving method and a touch driving method based on one vertical sync signal in a related art display device with an integrated touch screen.

FIG. 1 is a timing chart showing signals during a display period and a touch period based on one vertical sync signal, in a general display device with an integrated touch screen.

In a general display device with integrated in-cell type self-capacitive touch screen, as shown in FIG. 1, a display period D and a touch period T are time-divided and driven according to a data enable signal during one frame based on one vertical sync signal.

SUMMARY

Embodiments of the present invention relate to a display device with input system and method for driving the same. Accordingly, embodiments of the present invention are directed to a display device with an integrated touch screen and a method of driving the same that substantially obviate one or more problems due to limitations and disadvantages of the related art.

An aspect of embodiments is to provide a display device with an integrated touch screen that performs display driving and touch driving according to a horizontal sync signal.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a display device including an integrated touch screen, including: a panel including a plurality of electrodes, the electrodes being divided into n number of groups, where n is an integer greater than or equal to two, a data driver configured to: convert data, inputted from a timing controller, into data voltages, and supply the data voltages to a plurality of data lines, respectively, a gate driver configured to sequentially supply a gate signal to a plurality of gate lines, allowing the data voltages to be respectively applied to a plurality of pixels of the panel, during a high logic period of a horizontal sync signal, and a touch sensing unit configured to apply a touch scan signal to one of the n groups every n or more low logic periods of the horizontal sync signal, the touch scan signal being applied to each of the n groups at least one time, during one frame.

In another aspect, there is provided a method of driving a display device including an integrated touch screen, the method including: converting, by a data driver, data inputted from a timing controller into data voltages, supplying, by the data driver, the data voltages to a plurality of data lines, respectively, sequentially supplying, by a gate driver, a gate signal to a plurality of gate lines, allowing the data voltages to be respectively applied to a plurality of pixels of a panel, during a high logic period of a horizontal sync signal, the panel including a plurality of electrodes, the electrodes being divided into n number of groups, where n is an integer greater than or equal to two, and applying, by a touch sensing unit, a touch scan signal to one of the n groups every n or more low logic periods of the horizontal sync signal, the touch scan signal being applied to each of the n groups at least one time, during one frame.

In another aspect, there is provided a method of driving a display device including an integrated touch screen, including a panel including a plurality of electrodes that are divided into n number of groups, where n is an integer greater than or equal to two, and a touch sensing unit, the method including: applying data voltages to a plurality of pixels of the panel, during a high logic period of a horizontal sync signal, and applying, by the touch sensing unit, a touch scan signal to one of the n groups every n or more low logic periods of the horizontal sync signal, the touch scan signal being applied to each of the n groups at least one time, during one frame.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In a display device with an integrated touch screen according to an embodiment, a plurality of electrodes may be divided into n number of groups, and a touch scan signal may be sequentially applied to the n groups. However, for convenience of a description, the below description will be made for a method in which the electrodes are divided into three groups. Therefore, embodiments are not limited to the method where the electrodes are divided into the three groups, and the electrodes may be divided into two groups or four or more groups.

Figure 2:
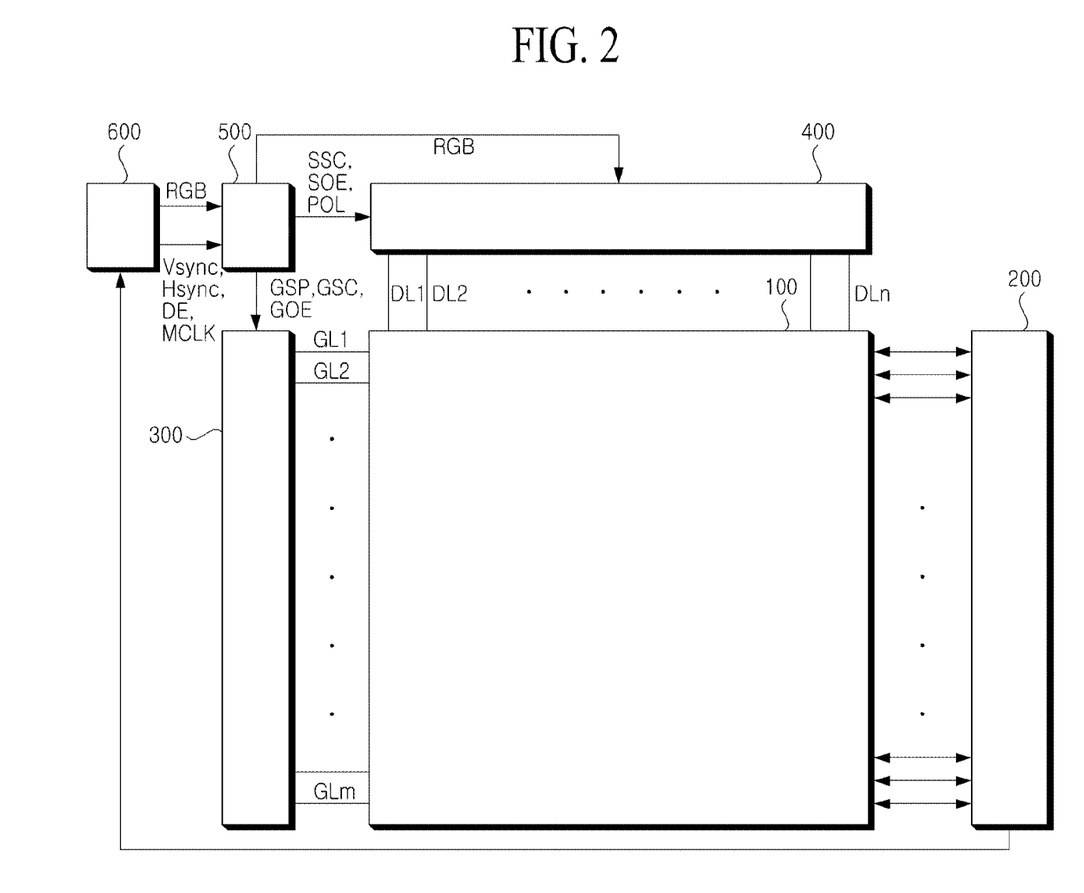
FIG. 2 is a block diagram illustrating a configuration of a display device with an integrated touch screen according to an embodiment.
Figure 3:
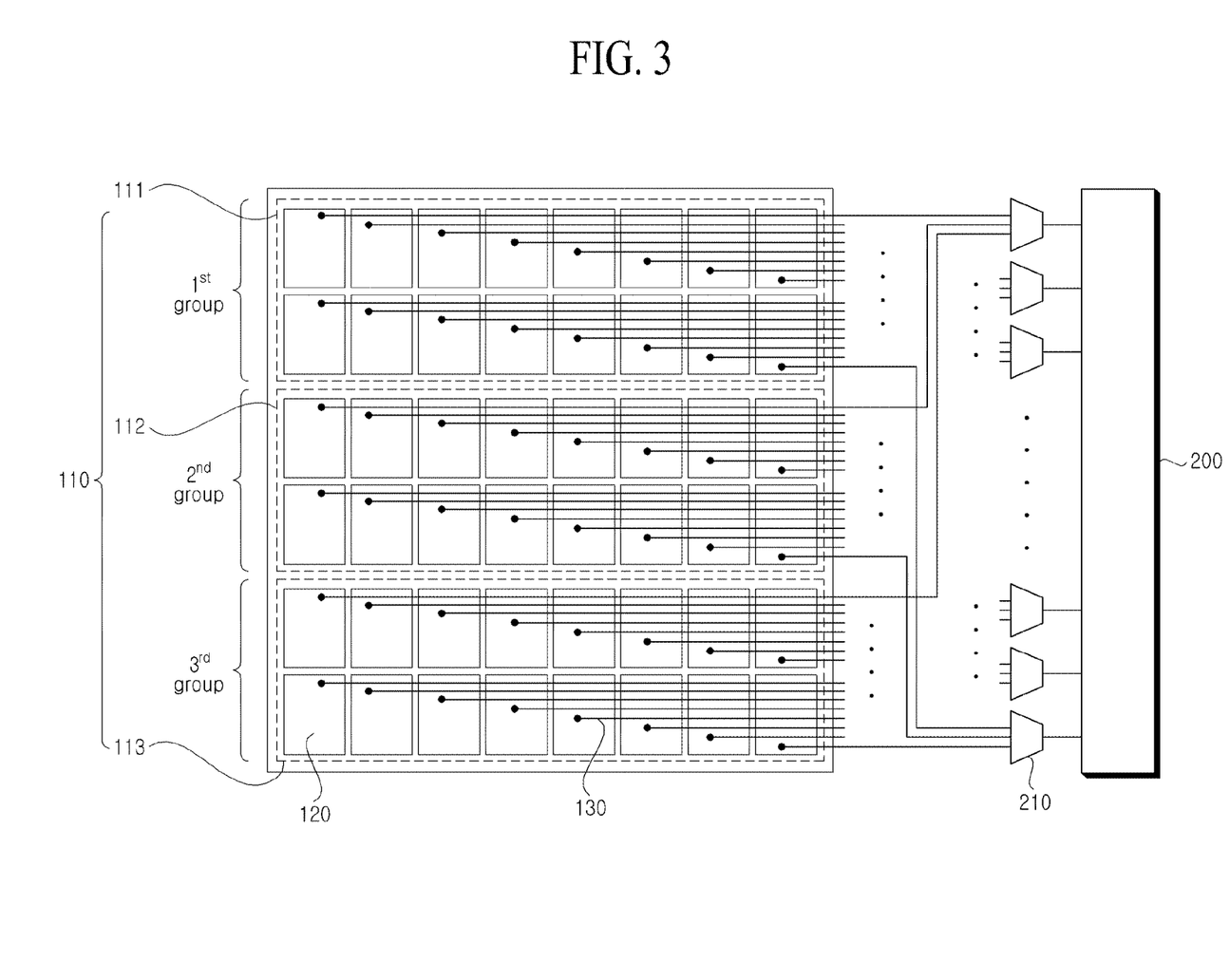
FIG. 3 is a schematic diagram illustrating a panel and touch sensing unit of a display device with an integrated touch screen according to an embodiment.

FIG. 2 is a block diagram illustrating a configuration of a display device with an integrated touch screen according to an embodiment. FIG. 3 is a schematic diagram illustrating a panel and touch sensing unit of a display device with an integrated touch screen according to an embodiment.

As illustrated in FIG. 2, the display device with an integrated touch screen according to an embodiment may include a panel 100, a touch sensing unit 200, a gate driver 300, a data driver 400, a timing controller 500, and a system 600.

The panel 100 may include a built-in touch screen (not shown), which may sense a user's touch position. In one example, the touch screen may be an in-cell type touch screen using a self-capacitive type.

The panel 100 may be configured in a structure in which a liquid crystal layer is formed between two substrates. In one example, a plurality of gate lines, a plurality of data lines intersecting the gate lines, a plurality of thin film transistors (TFTs) formed in respective intersection portions between the data lines and the gate lines, and a plurality of pixels formed in a matrix type by an intersection structure between the data lines and the gate lines may be disposed in a lower substrate of the panel 100.

The panel 100, as illustrated in FIG. 3, may include a plurality of electrodes 120 and a plurality of lines 130.

In response to a common voltage being applied for display driving of the panel 100, the electrodes may operate as pixel electrodes formed in the respective pixels and common electrodes for driving liquid crystal. In response to a touch scan signal being applied for touch sensing, the electrodes 120 may operate as touch electrodes for sensing a touch position.

The electrodes 120 may be divided into a total of three groups 110, including first to third groups 111 to 113, in the panel 100. The electrodes 120 may be formed in a block type of groups 110, and, in one example, may be divided and formed in a gate-line direction.

The plurality of lines 130 may connect the electrodes 120 and the touch sensing unit 200. For example, the lines 130 may transfer a touch scan signal applied from the touch sensing unit 200 to the electrodes 120 of the panel 100, respectively. The lines 130 may transfer the capacitive changes received from the electrodes 120 of the panel 100 to the touch sensing unit 200, respectively.

As illustrated in FIG. 3, the touch sensing unit 200 may apply the touch scan signal to one of the three groups every three or more low logic periods of a horizontal sync signal, in which case the touch sensing unit 200 may apply the touch scan signal to the three groups at least one time.

For example, during a first low logic period selected from among the three or more low logic periods of the horizontal sync signal, the touch sensing unit 200 may apply the touch scan signal to one of the three groups. During a second low logic period selected from among the three or more low logic periods of the horizontal sync signal, the touch sensing unit 200 may apply the touch scan signal to another group (to which the touch scan signal is not applied) of the three groups. During a third low logic period selected from among the three or more low logic periods of the horizontal sync signal, the touch sensing unit 200 may apply the touch scan signal to the other group (to which the touch scan signal is not applied) of the three groups.

The touch sensing unit 200 of the display device with an integrated touch screen according to an embodiment may apply the touch scan signal to the group (which has received the touch scan signal for the first time) of the three groups, during a selected fourth low logic period. In other words, by repeatedly performing the above-described operation during each of low logic periods after the selected fourth low logic period, the touch sensing unit 200 may allow the touch scan signal to be applied to the three divided groups at least one time.

In the display device with an integrated touch screen according to an embodiment, a case in which the touch scan signal is applied to the three groups during the three or more low logic periods has been described above as an example, but embodiments are not limited thereto. As another example, the touch scan signal may be applied to the two or more groups during the two low logic periods, or the touch scan signal may be applied to the four or more groups during the four or more low logic periods.

As described above, display driving and touch driving may not be divided and performed according to a data enable signal during one frame based on one vertical sync signal, and may be temporally divided and performed in units of one line based on one horizontal sync signal. Also, a touch report rate may become higher by increasing the number of times the touch scan signal is applied to the electrodes 120 of the panel 100 during one frame, and thus touch input or dragging may be more accurately sensed.

The touch sensing unit 200 according to an embodiment may include a touch scan signal generator that may generate the touch scan signal to be supplied to the plurality of electrodes of the panel 100 for touch sensing.

Alternatively, the touch sensing unit 200 may be implemented as a plurality of touch sensing units, in which case each of the touch sensing units may include the touch scan signal generator. The touch scan signal may be a touch driving voltage, which may have a level higher than that of a common voltage that is applied to the plurality of electrodes of the panel 100 for display driving. In one example, the touch driving voltage may have a low level equal to that of the common voltage, and a high level higher than that of the common voltage.

Moreover, the touch sensing unit 200 according to an embodiment may receive touch sensing signals from the plurality of electrodes 120 to calculate touch coordinates between low logic periods in which the touch scan signal is applied, sensing a user's touch.

For example, the touch sensing unit 200 may calculate touch coordinates in a section from a time (for which the touch scan signal is applied to one group during a selected low logic period) to a time for which the touch scan signal is applied to another group during a next-selected low logic period, sensing a touch. For example, the calculated touch coordinates may be transferred to the system 600, and may enable the panel 100 to detect a user's touch coordinates.

The display device with an integrated touch screen according to an embodiment, as illustrated in FIG. 3, may further include a plurality of switching units 210.

Each of the switching units 210 may perform switching in order for the touch scan signal (which is outputted from the touch sensing unit 200) to be applied to one of the three groups.

For example, each of the switching units 210 may perform a switching function that allows the touch scan signal, generated by the touch sensing unit 200, to be applied to one of the first to third groups 111 to 113 into which the plurality of electrodes 120 are divided.

In other words, during the selected first low logic period of the horizontal sync signal, each of the switching units 210 may perform switching in order for the touch scan signal to be applied to one of the three groups 111 to 113 of the panel 100. During the selected second low logic period of the horizontal sync signal, the switching unit 210 may perform switching in order for the touch scan signal to be applied to another group (to which the touch scan signal is not applied) of the three groups 111 to 113 of the panel 100. During the selected third low logic period of the horizontal sync signal, the switching unit 210 may perform switching in order for the touch scan signal to be applied to the other group (to which the touch scan signal is not applied) of the three groups 111 to 113 of the panel 100.

Each of the switching units 210 of the display device with an integrated touch screen according to an embodiment may apply the touch scan signal to the group (which has received the touch scan signal for the first time) of the three groups, during a selected fourth low logic period.

For example, each of the switching units 210 may be connected to one electrode for each group. In one example, each of the switching units 210 according to an embodiment may be a signal distributor, such as a 1:3 demultiplexer.

Moreover, the plurality of switching units 210 may be included in the touch sensing unit 200, and may perform switching in order for the touch scan signal, outputted from the touch sensing unit 200, to be applied to one of the three groups.

With reference again to FIG. 2, the gate driver 300 may apply a gate signal to a pixel of the panel 100 during a high logic period of the horizontal sync signal.

For example, the gate driver 300 may sequentially apply the gate signal to a plurality of gate lines GL1 to GLm, and may select the respective lines of the panel 100 which receive data voltages. The pixels of the panel 100 may be charged with respective data voltages inputted from the data driver 400 during the high logic period of the horizontal sync signal Hsync in response to the gate signal, and may hold the respective data voltages during the low logic period of the horizontal sync signal Hsync.

For example, the gate driver 300 may shift a gate start pulse GSP transferred from the timing controller 500 according to a gate shift clock GSC, may sequentially supply the gate signal having a gate-on voltage (Von), and may supply a gate-off voltage (Voff) to the gate lines GL1 to GLm during the other period for which the gate signal having the gate-on voltage is not supplied. In one example, the gate signal may include a gate scan signal.

The gate driver 300 may be provided independently from the panel 100, and may be electrically connected to the panel 100 in various types. However, the gate driver 300 may be provided in a gate-in panel type in which the gate driver 300 is disposed inside the panel 100, in which case a start signal VST and a gate clock GCLK may be used as gate control signals for controlling the gate driver 300.

The data driver 400 may convert data, e.g., red, green, and blue (RGB) data, inputted from the timing controller 500, into data voltages and may output the data voltages. The data voltages outputted from the data driver 400 may be supplied to a plurality of data lines DL1 to DLn, respectively.

In other words, the data driver 400 may shift a source start pulse SSP from the timing controller 500 to generate a sampling signal according to a source shift clock SSC. The data driver 400 may latch pixel data, e.g., RGB data (e.g., image data) according to the sampling signal, and may convert the latched pixel data into data signals, and then may supply the data signals to the data lines in units of a horizontal line in response to a source output enable signal SOE, respectively. Each of the data signals may include a data voltage.

The data driver 400 may include a sampling signal generating unit, a latch unit, a digital-to-analog (D/A) converter, and an output buffer.

The timing controller 500 may receive timing signals, such as the vertical sync signal Vsync, the horizontal sync signal Hsync, the data enable signal DE, and a main clock CLK, from the system 600 to generate control signals GCS and DCS for controlling the respective operational timings of the gate driver 300 and data driver 400. Also, the timing controller 500 may realign data, e.g., RGB data, inputted from the system 600 to output the realigned data, e.g., RGB data, to the data driver 400.

For example, the vertical sync signal Vsync may be a signal that defines one frame period. Therefore, one period of the vertical sync signal may be set as one frame period. Also, the horizontal sync signal Hsync may be a signal that defines one horizontal period for applying data to pixels corresponding to one line in a pixel array of the panel 100. Accordingly, one period of the horizontal sync signal may be set as one horizontal period, and one horizontal period may be calculated by dividing one frame period by the number of lines formed in the panel 100. The data enable signal DE may be a signal that defines a period for which valid data are inputted, and one period may be set as one horizontal period identically to the horizontal sync signal. The main clock CLK may be synchronized with the bits of data, e.g., RGB data.

The system 600 may transmit data, e.g., RGB data, and the timing signals Vsync, Hsync, DE, and MCLK to the timing controller 500. For example, the data, e.g., RGB data, for one line may be transmitted to the timing controller 500 in synchronization with the high logic period of the horizontal sync signal, but may not be transmitted to the timing controller 500 during the low logic period of the horizontal sync signal. The timing signal Vsync may be the vertical sync signal, and the timing signal Hsync may be the horizontal sync signal.

Moreover, the system 600 may execute a program associated with touch coordinate values such that the panel 100 recognizes the touch coordinates transferred from the touch sensing unit 200.

The display device with an integrated touch screen according to an embodiment may sequentially drive a plurality of electrodes for touch sensing in units of a group, and may supply the touch scan signal for touch sensing to a plurality of electrodes by group according to the horizontal sync signal. This will be described in more detail with reference to FIGS. 2 and 4.

Figure 4:
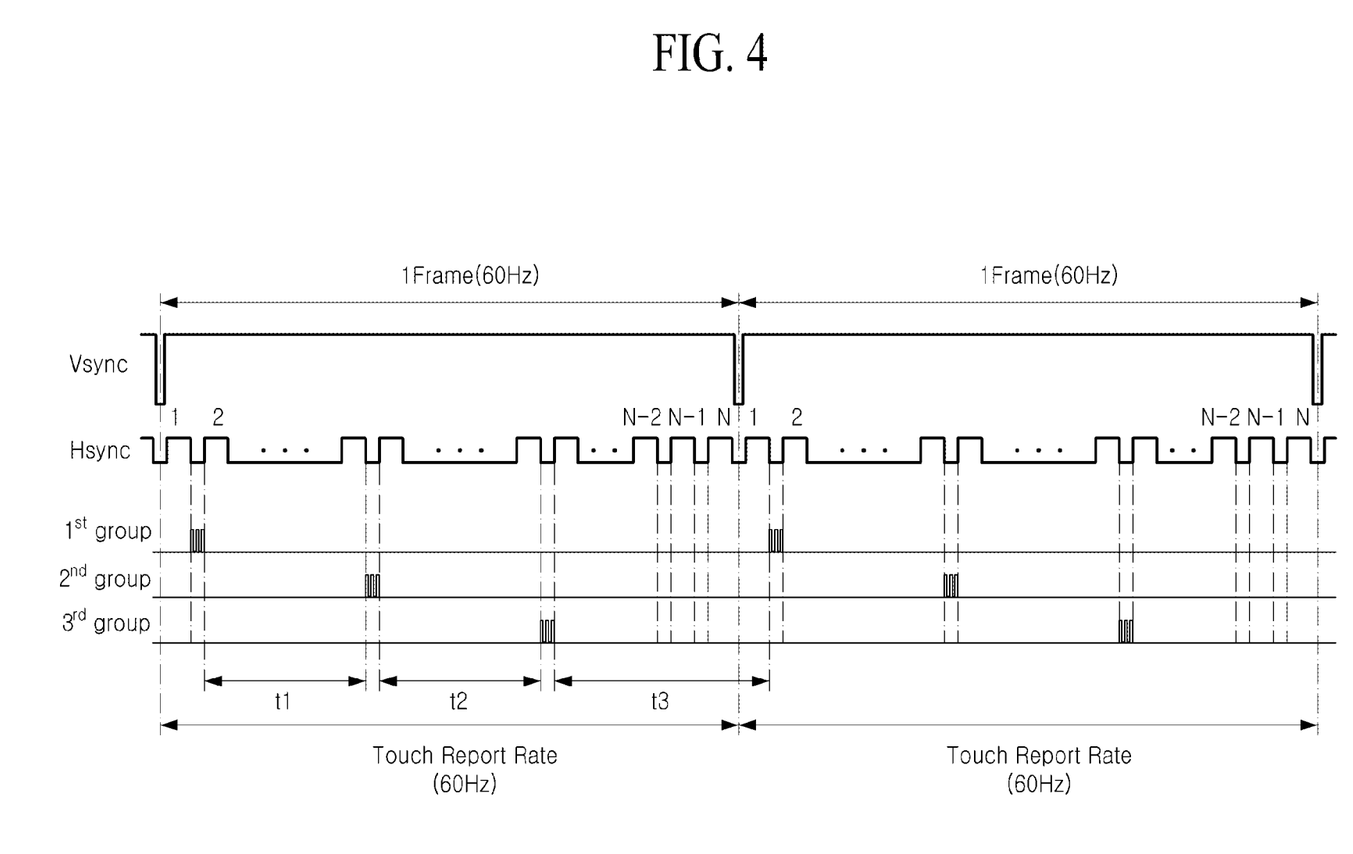
FIG. 4 is a timing chart showing signals in a driving method based on one horizontal sync signal of a display device with an integrated touch screen according to an embodiment.

FIG. 4 is a timing chart showing signals in a driving method based on one horizontal sync signal of a display device with an integrated touch screen according to an embodiment.

In the method of driving the display device with an integrated touch screen according to an embodiment, as shown in FIG. 4, the gate driver 300 may apply data voltages to the pixels of the panel 100 during the high logic period of the horizontal sync signal.

For example, the gate drive 300 may sequentially supply the gate signal to the gate lines GL1 to GLm, and may select the respective lines of the panel 100 which receive data voltages. The pixels of the panel 100 may be charged with respective data voltages inputted from the data driver 400 during the high logic period of the horizontal sync signal Hsync in response to the gate signal, and may hold the respective data voltages during the low logic period of the horizontal sync signal Hsync.

Subsequently, the touch sensing unit 200 may apply the touch scan signal to one of the three groups during the three low logic periods of the horizontal sync signal Hsync, in which case the touch sensing unit 200 may apply the touch scan signal to the three groups at least one time.

For example, the touch sensing unit 200 may apply the touch scan signal to a plurality of electrodes included in the first group during the selected first low logic period of the horizontal sync signal, and may apply the touch scan signal to a plurality of electrodes included in the second group during the selected second low logic period of the horizontal sync signal. Also, the touch sensing unit 200 may apply the touch scan signal to a plurality of electrodes included in the third group during the selected third low logic period of the horizontal sync signal.

Subsequently, the touch sensing unit 200 may receive respective touch sensing signals from the plurality of electrodes to calculate touch coordinates between low logic periods for which the touch scan signal is applied.

For example, the touch sensing unit 200 may calculate sensed touch coordinates of the first group with the touch scan signal that is applied thereto during a selected first low logic period, in a section t1 from a time (for which the touch scan signal is applied to the first group during the selected first low logic period) to a time for which the touch scan signal is applied during a selected second low logic period. The touch sensing unit 200 may calculate sensed touch coordinates of the second group with the touch scan signal that is applied thereto during the selected second low logic period, in a section t2 from a time (for which the touch scan signal is applied to the second group during the selected second low logic period) to a time for which the touch scan signal is applied during a selected third low logic period. The touch sensing unit 200 may calculate sensed touch coordinates of the third group with the touch scan signal that is applied thereto during the selected third low logic period, in a section t3 from a time (for which the touch scan signal is applied to the third group during the selected third low logic period) to a time for which the touch scan signal is applied during a selected first low logic period of a next frame.

As described above, in the method of driving the display device with an integrated touch screen according to an embodiment, a display period and a touch period may be divided with the horizontal sync signal Hsync instead of the data enable signal DE, during one frame.

Hereinafter, another driving method based on one horizontal sync signal of the display device with an integrated touch screen according to an embodiment will be described.

In a general display device with integrated in-cell type touch screen, a frequency at which new data are transferred to all pixels of a panel is called a "display frame rate," and a frequency at which touch data obtained in a touch screen are transferred to a system is called a "touch frame rate." That is, as the touch report rate becomes higher than the display frame rate, a speed at which coordinates inputted to a touch panel are transmitted may become faster, and thus touch sensitivity a user feels may increase, and a touch input can be more accurately expressed. Hereinafter, the above-described features will be described with reference to FIGS. 5 and 6.

Figure 5:
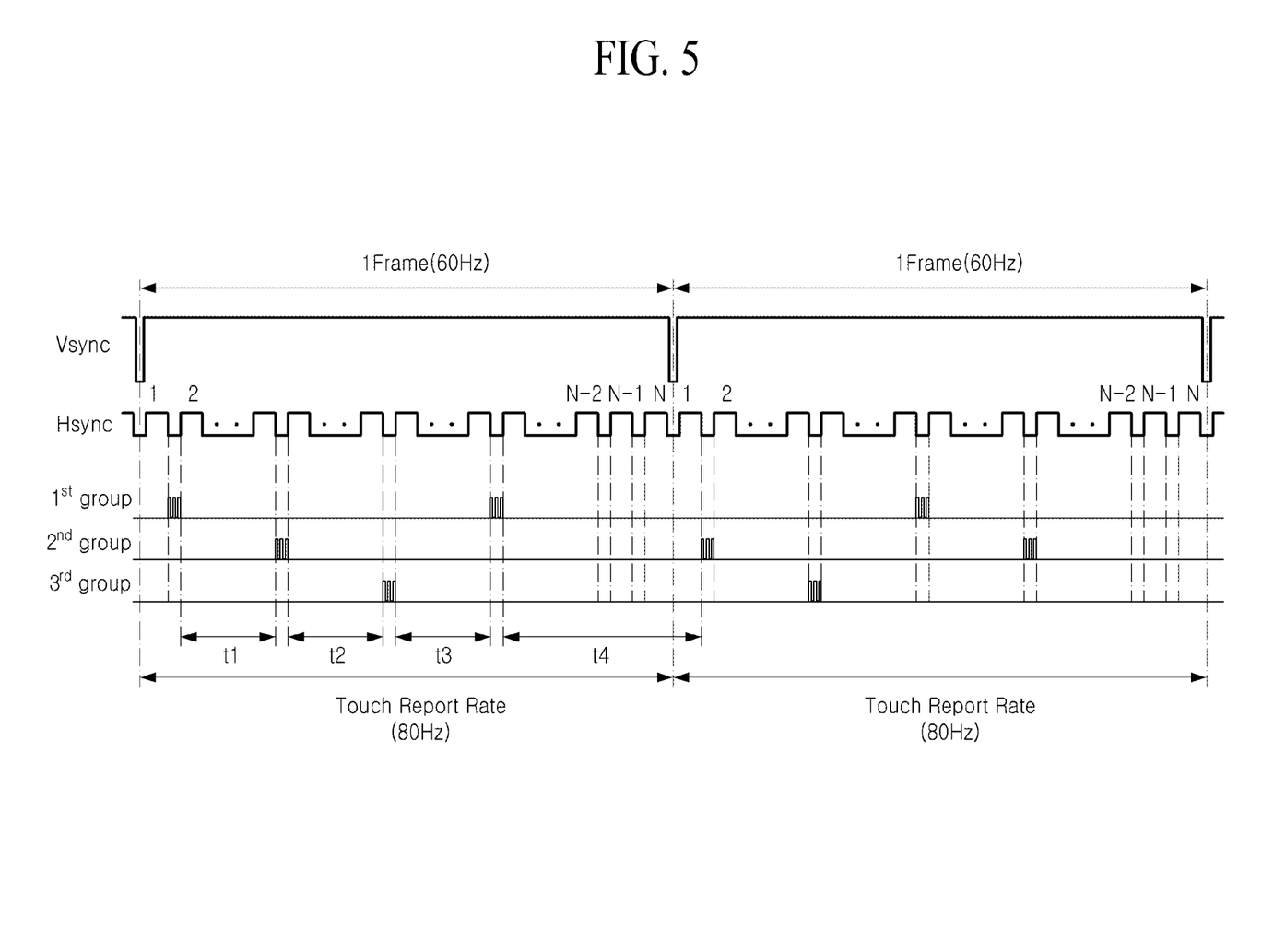
FIGS. 5 and 6 are timing charts showing signals in another driving method based on one horizontal sync signal of the display device with an integrated touch screen according to an embodiment.
Figure 6:
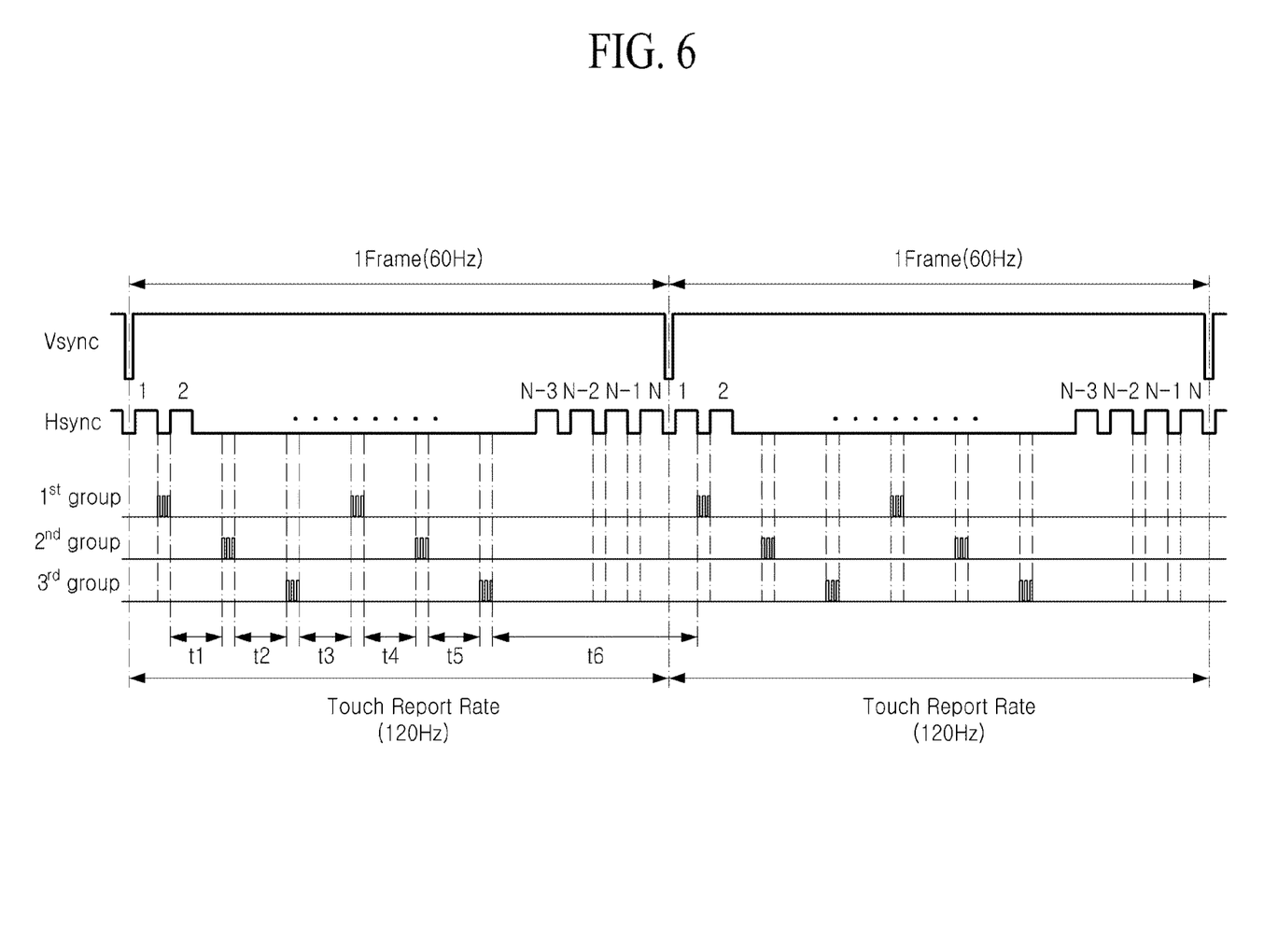

FIGS. 5 and 6 are timing charts showing signals in a driving method based on one horizontal sync signal of the display device with an integrated touch screen according to an embodiment.

In a method of driving the display device with an integrated touch screen according to an embodiment, as shown in FIG. 5, the gate driver 300 may apply gate signals to the pixels of the panel 100 during the high logic period of the horizontal sync signal.

For example, the gate drive 300 may sequentially supply the gate signal to the gate lines GL1 to GLm, and may select the respective lines of the panel 100 which receive data voltages. The pixels of the panel 100 may be charged with respective data voltages inputted from the data driver 400 during the high logic period of the horizontal sync signal Hsync in response to the gate signal, and may hold the respective data voltages during the low logic period of the horizontal sync signal Hsync.

Subsequently, the touch sensing unit 200 may apply the touch scan signal to one of the three groups during the four low logic periods of the horizontal sync signal Hsync, in which case the touch sensing unit 200 may apply the touch scan signal to the three groups at least one time.

For example, the touch sensing unit 200 may apply the touch scan signal to a plurality of electrodes included in the first group during the selected first low logic period of the horizontal sync signal, and may apply the touch scan signal to a plurality of electrodes included in the second group during the selected second low logic period of the horizontal sync signal. Also, the touch sensing unit 200 may apply the touch scan signal to a plurality of electrodes included in the third group during the selected third low logic period of the horizontal sync signal, and again may apply the touch scan signal to the plurality of electrodes included in the first group during the selected fourth low logic period of the horizontal sync signal.

Subsequently, the touch sensing unit 200 may receive respective touch sensing signals from the plurality of electrodes to calculate touch coordinates between low logic periods for which the touch scan signal is applied.

For example, the touch sensing unit 200 may calculate sensed touch coordinates of the first group with the touch scan signal that is applied thereto during a selected first low logic period, in a section t1 from a time (for which the touch scan signal is applied to the first group during the selected first low logic period) to a time for which touch scan signal is applied during a selected second low logic period. The touch sensing unit 200 may calculate sensed touch coordinates of the second group with the touch scan signal that is applied thereto during the selected second low logic period, in a section t2 from a time (for which the touch scan signal is applied to the second group during the selected second low logic period) to a time for which touch scan signal is applied during a selected third low logic period.

Likewise, the touch sensing unit 200 may calculate sensed touch coordinates of the third group with the touch scan signal that is applied thereto during the selected third low logic period, in a section t3 from a time (for which the touch scan signal is applied to the third group during the selected third low logic period) to a time for which the touch scan signal is applied during a selected fourth low logic period. The touch sensing unit 200 may calculate sensed touch coordinates of the first group with the touch scan signal that is applied thereto during the selected fourth low logic period, in a section t4 from a time (for which the touch scan signal is applied to the fourth group during the selected fourth low logic period) to a time for which the touch scan signal is applied during a selected first low logic period of a next frame.

The display frame rate of the display device with an integrated touch screen according to an embodiment may be, e.g., 60 Hz. In one example, as in the above-described embodiment, by applying the touch scan signal to a total of three groups a total of, e.g., four times during one frame, a driving method based on one horizontal sync signal may transmit touch sensing data (which are obtained in the touch screen) to the system 600 four times, thus securing the touch report rate of, e.g., 80 Hz.

As the touch report rate of a touch sensing signal during one frame may become higher than the display frame rate during one frame, a speed at which coordinates inputted to a touch panel are transmitted may become faster, and thus touch sensitivity a user feels may increase, and a touch input can be more accurately expressed.

In another method of driving the display device with an integrated touch screen according to an embodiment, as shown in FIG. 6, the gate driver 300 applies gate signals to the pixels of the panel 100 during the high logic period of the horizontal sync signal.

For example, the gate drive 300 may sequentially supply the gate signal to the gate lines GL1 to GLm, and may select the respective lines of the panel 100 which receive data voltages. The pixels of the panel 100 may be charged with respective data voltages inputted from the data driver 400 during the high logic period of the horizontal sync signal Hsync in response to the gate signal, and may hold the respective data voltages during the low logic period of the horizontal sync signal Hsync.

Subsequently, the touch sensing unit 200 may apply the touch scan signal to one of the three groups during the six low logic periods of the horizontal sync signal Hsync, in which case the touch sensing unit 200 may apply the touch scan signal to the three groups at least one time.

For example, the touch sensing unit 200 may apply the touch scan signal to a plurality of electrodes included in the first group during the selected first low logic period of the horizontal sync signal, may apply the touch scan signal to a plurality of electrodes included in the second group during the selected second low logic period of the horizontal sync signal, may apply the touch scan signal to a plurality of electrodes included in the third group during the selected third low logic period of the horizontal sync signal, and may again apply the touch scan signal to the plurality of electrodes included in the first group during the selected fourth low logic period of the horizontal sync signal. Also, the touch sensing unit 200 may again apply the touch scan signal to the plurality of electrodes included in the second group during the selected fifth low logic period of the horizontal sync signal, and may again apply the touch scan signal to the plurality of electrodes included in the third group during the selected sixth low logic period of the horizontal sync signal.

Subsequently, the touch sensing unit 200 may receive respective touch sensing signals from the plurality of electrodes to calculate touch coordinates between low logic periods for which the touch scan signal is applied.

For example, the touch sensing unit 200 may calculate touch coordinates of the first group in a section t1, and may calculate touch coordinates of the second group in a section t2. Likewise, the touch sensing unit 200 may calculate touch coordinates of the third group in a section t3, and may calculate touch coordinates of the first group in a section t4. Also, the touch sensing unit 200 may calculate touch coordinates of the second group in a section t5, and may calculate touch coordinates of the third group in a section t6.

The display frame rate of the display device with an integrated touch screen according to an embodiment may be, e.g., 60 Hz. In one example, as in the above-described embodiment, by applying the touch scan signal to a total of three groups a total of, e.g., six times during one frame, another driving method based on one horizontal sync signal may transmit touch sensing data (which are obtained in the touch screen) to the system 600 six times, thus securing the touch report rate of, e.g., 120 Hz.

According to embodiments, the display driving and touch driving of the in-cell type self-capacitive touch screen may not be divided in units of one frame based on one vertical sync signal but may be divided and performed in units of one line based on one horizontal sync signal.

Moreover, according to embodiments, touch input or dragging can be more accurately detected by increasing a touch report rate.

It will be apparent to those skilled in the art that various modifications and variations can be made in embodiments of the present invention without departing from the spirit or scope of the invention. For example, as would be understood by one skilled in the art, any of the groups or subsets of electrodes may be interchanged, as appropriate. As another example, a number other than three groups or subsets may be defined. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising an integrated touch screen, comprising:
   a panel comprising a plurality of electrodes, a plurality of gate lines, and a plurality of data lines, the electrodes being divided into n groups of electrodes, where n is an integer greater than or equal to two;
   a data driver configured to supply data voltages to the data lines;
   a gate driver configured to sequentially supply a gate signal to the gate lines during a first logic state period of a horizontal sync signal; and
   a touch sensing unit configured to:
      apply a touch scan signal to one of the n groups of electrodes every n or more second logic state periods of the horizontal sync signal, the touch scan signal being applied to each of the n groups at least once during one frame; and
      determine touch coordinates of a first group of the electrodes with the touch scan signal applied thereto during a first one of the second logic state periods of the horizontal sync signal, in a first time period from when the touch scan signal is applied to the first group of the electrodes during the first one of the second logic state periods of the horizontal sync signal to when the touch signal is applied to a second group of the electrodes during a second one of the second logic state periods of the horizontal sync signal.

2. The display device of claim 1, wherein the touch sensing unit is further configured to:
   determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods; and
   determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to a first one of the second logic state periods of the horizontal sync signal of a next frame after the one frame.

3. The display device of claim 1, wherein the touch sensing unit is further configured to:
   determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;
   determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal; and
   determine touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to a first one of the second logic state periods of the horizontal sync signal of a next frame after the one frame.

4. The display device of claim 1, wherein the touch sensing unit is further configured to:
   determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;
   determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal;
   determine touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to when the touch signal is applied to the second group of the electrodes during a fifth one of the second logic state periods of the horizontal sync signal; and
   determine touch coordinates of the second group of the electrodes with the touch scan signal applied thereto during the fifth one of the second logic state periods of the horizontal sync signal, in a fifth time period from when the touch scan signal is applied to the second group of the electrodes during the fifth one of the second logic state periods of the horizontal sync signal to when the touch signal is applied to the third group of the electrodes during a sixth one of the second logic state periods of the horizontal sync signal; and determine touch coordinates of the third group of the electrodes with the touch scan signal applied thereto during the sixth one of the second logic state periods of the horizontal sync signal, in a sixth time period from when the touch scan signal is applied to the third group of the electrodes during the sixth one of the second logic state periods of the horizontal sync signal to a first one of the second logic state periods of the horizontal sync signal of a next frame after the one frame.

5. The display device of claim 1, wherein one row of the display device is displayed during one period of the horizontal sync signal.

6. The display device of claim 1, wherein at least one of the groups of electrodes is driven by the touch scan signal two or more times during one vertical sync period defining said one frame of the display device.

7. The display device of claim 6, wherein a touch report rate of each of the touch sensing signals during the one frame is higher than a display frame rate during the one frame.

8. The display device of claim 1, wherein the n groups comprise groups that are divided in a direction of the gate lines.

9. The display device of claim 1, further comprising a plurality of switching units further configured to perform switching for the touch scan signal, outputted from the touch sensing unit, to be applied to one of the n groups.

10. The display device of claim 9, wherein each of the switching units is connected to one electrode of each of the groups.

11. The display device of claim 9, wherein each of the switching units comprises an n:1 multiplexer.

12. The display device of claim 1, wherein the touch sensing unit comprises a plurality of n:1 multiplexers further configured to perform switching for the touch scan signal, outputted from the touch sensing unit, to be applied to one of the n groups.

13. A driver circuit for driving a display device with an integrated touch screen, the display device comprising a panel including a plurality of electrodes, a plurality of gate lines to which a gate signal is sequentially supplied during a first logic state period of a horizontal sync signal, and a plurality of data lines to which data voltages are supplied, the electrodes being divided into n groups of electrodes, where n is an integer greater than or equal to two, the driver circuit comprising:
circuitry configured to apply a touch scan signal to one of the n groups of electrodes every n or more second logic state periods of the horizontal sync signal, the touch scan signal being applied to each of the n groups at least once during one frame; and
the circuitry further configured to determine touch coordinates of a first group of the electrodes with the touch scan signal applied thereto during a first one of the second logic state periods of the horizontal sync signal, in a first time period from when the touch scan signal is applied to the first group of the electrodes during the first one of the second logic state periods of the horizontal sync signal to when the touch signal is applied to a second group of the electrodes during a second one of the second logic state periods of the horizontal sync signal.

14. The driver circuit of claim 13, wherein the circuitry is further configured to:
determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods; and
determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to a first one of the second logic state periods of the horizontal sync signal of a next frame after the one frame.

15. The driver circuit of claim 13, wherein the circuitry is further configured to:
determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;
determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal; and
determine touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to a first one of the second logic state periods of the horizontal sync signal of a next frame after the one frame.

16. The driver circuit of claim 13, wherein the circuitry is further configured to:
determine touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;
determine touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal;

determine touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to when the touch signal is applied to the second group of the electrodes during a fifth one of the second logic state periods of the horizontal sync signal; and determine touch coordinates of the second group of the electrodes with the touch scan signal applied thereto during the fifth one of the second logic state periods of the horizontal sync signal, in a fifth time period from when the touch scan signal is applied to the second group of the electrodes during the fifth one of the second logic state periods of the horizontal sync signal to when the touch signal is applied to the third group of the electrodes during a sixth one of the second logic state periods of the horizontal sync signal; and determine touch coordinates of the third group of the electrodes with the touch scan signal applied thereto during the sixth one of the second logic state periods of the horizontal sync signal, in a sixth time period from when the touch scan signal is applied to the third group of the electrodes during the sixth one of the second logic state periods of the horizontal sync signal to a first one of the second logic state periods of the horizontal sync signal of a next frame after the one frame.

17. The driver circuit of claim 13, wherein one row of the display device is displayed during one period of the horizontal sync signal.

18. The driver circuit of claim 13, wherein at least one of the groups of electrodes is driven by the touch scan signal two or more times during one vertical sync period defining said one frame of the display device.

19. The driver circuit of claim 18, wherein a touch report rate of each of the touch sensing signals during the one frame is higher than a display frame rate during the one frame.

20. The driver circuit of claim 13, wherein the n groups comprise groups that are divided in a direction of the gate lines.

21. The driver circuit of claim 13, further comprising a plurality of switching units further configured to perform switching for the touch scan signal to be applied to one of the n groups.

22. The driver circuit of claim 21, wherein each of the switching units is connected to one electrode of each of the groups.

23. The driver circuit of claim 21, wherein each of the switching units comprises an n:1 multiplexer.

24. The driver circuit of claim 13, wherein the circuitry further comprises a plurality of n:1 multiplexers further configured to perform switching for the touch scan signal to be applied to one of the n groups.

25. A method of driving a display device with an integrated touch screen, the display device comprising a panel including a plurality of electrodes, a plurality of gate lines to which a gate signal is sequentially supplied during a first logic state period of a horizontal sync signal, and a plurality of data lines to which data voltages are supplied, the electrodes being divided into n groups of electrodes, where n is an integer greater than or equal to two, the method comprising:

applying a touch scan signal to one of the n groups of electrodes every n or more second logic state periods of the horizontal sync signal, the touch scan signal being applied to each of the n groups at least once during one frame; and determining touch coordinates of a first group of the electrodes with the touch scan signal applied thereto during a first one of the second logic state periods of the horizontal sync signal, in a first time period from when the touch scan signal is applied to the first group of the electrodes during the first one of the second logic state periods of the horizontal sync signal to when the touch signal is applied to a second group of the electrodes during a second one of the second logic state periods of the horizontal sync signal.

26. The method of claim 25, further comprising:

determining touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods; and determining touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to a first one of the second logic state periods of the horizontal sync signal of a next frame after the one frame.

27. The method of claim 25, further comprising:

determining touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;

determining touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal; and determining touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to a first one of the second logic state periods of the horizontal sync signal of a next frame after the one frame.

28. The method of claim 25, further comprising:

determining touch coordinates of the second group of the electrodes, with the touch scan signal applied thereto during the second one of the second logic state periods of the horizontal sync signal, in a second time period from when the touch scan signal is applied to the second group of the electrodes during the second one of the second logic state periods of the horizontal sync signal to when the touch signal is applied to a third group of the electrodes during a third one of the second logic state periods of the horizontal sync signal;

determining touch coordinates of the third group of the electrodes, with the touch scan signal applied thereto during the third one of the second logic state periods of the horizontal sync signal, in a third time period from when the touch scan signal is applied to the third group of the electrodes during the third one of the second logic state periods of the horizontal sync signal to when the touch signal is applied to the first group of the electrodes during a fourth one of the second logic state periods of the horizontal sync signal;

determining touch coordinates of the first group of the electrodes with the touch scan signal applied thereto during the fourth one of the second logic state periods of the horizontal sync signal, in a fourth time period from when the touch scan signal is applied to the first group of the electrodes during the fourth one of the second logic state periods of the horizontal sync signal to when the touch signal is applied to the second group of the electrodes during a fifth one of the second logic state periods of the horizontal sync signal; and determining touch coordinates of the second group of the electrodes with the touch scan signal applied thereto during the fifth one of the second logic state periods of the horizontal sync signal, in a fifth time period from when the touch scan signal is applied to the second group of the electrodes during the fifth one of the second logic state periods of the horizontal sync signal to when the touch signal is applied to the third group of the electrodes during a sixth one of the second logic state periods of the horizontal sync signal; and determining touch coordinates of the third group of the electrodes with the touch scan signal applied thereto during the sixth one of the second logic state periods of the horizontal sync signal, in a sixth time period from when the touch scan signal is applied to the third group of the electrodes during the sixth one of the second logic state periods of the horizontal sync signal to a first one of the second logic state periods of the horizontal sync signal of a next frame after the one frame.

29. The method of claim 25, wherein one row of the display device is displayed during one period of the horizontal sync signal.

30. The method of claim 25, wherein at least one of the groups of electrodes is driven by the touch scan signal two or more times during one vertical sync period defining said one frame of the display device.

31. The method of claim 30, wherein a touch report rate of each of the touch sensing signals during the one frame is higher than a display frame rate during the one frame.

32. The method of claim 25, wherein the n groups comprise groups that are divided in a direction of the gate lines.

* * * * *